United States Patent [19]

Memon

[11] Patent Number: 5,506,307

[45] Date of Patent: Apr. 9, 1996

[54] MODIFIER FOR POLYPROPYLENE IMPARTING IMPROVED MELT STRENGTH

[75] Inventor: Nazir A. Memon, Yardley, Pa.

[73] Assignee: Rohm and Haas Company, Philadelphia, Pa.

[21] Appl. No.: 428,284

[22] Filed: Apr. 25, 1995

[51] Int. Cl.$^6$ .......................... C08L 23/10; C08L 23/16; C08L 33/12

[52] U.S. Cl. .............................................. 525/227; 525/94

[58] Field of Search ........................ 525/227, 94

[56] References Cited

U.S. PATENT DOCUMENTS

| | | | |
|---|---|---|---|
| 3,062,765 | 11/1962 | Sherman et al. | 260/296 |
| 4,094,927 | 6/1978 | Harrop et al. | 260/897 |
| 4,156,703 | 5/1979 | Harrop et al. | 260/876 |
| 4,963,622 | 5/1985 | Heitz | 525/227 |
| 5,128,410 | 7/1992 | Ilenda et al. | 525/71 |
| 5,247,024 | 9/1993 | Natoli et al. | 525/298 |
| 5,352,500 | 10/1994 | Memon | 428/357 |

*Primary Examiner*—Carman J. Seccuro, Jr.
*Attorney, Agent, or Firm*—Roger K. Graham

[57] ABSTRACT

Polymer melt blends of a homopolymer of propylene or a copolymer of propylene with up to 40 weight percent of another monoolefin, with a homopolymer of one or more of a $C_{10}$ to $C_{30}$ alkyl (meth)acrylate or a copolymer containing at least 70 weight percent of the one or more $C_{10}$ to $C_{30}$ ester of an alkyl (meth)acrylate with up to 30 weight percent of one or more of a $C_1$ to $C_9$ alkyl (meth)acrylate, the homopolymer or copolymer having a weight-average molecular weight of at least 670,000, exhibit a relative characteristic time, as herein described, at least five (5) times that for the unmodified homo- or copolymer of polypropylene, and a melt strength ratio (as judged by relative sag resistance) at least 5 times that of the unmodified homo- or copolymer of polypropylene. Such blends are useful in thermoforming operations wherein sheet is thermoformed into cartons, containers, appliance housings, and the like.

3 Claims, No Drawings

MODIFIER FOR POLYPROPYLENE IMPARTING IMPROVED MELT STRENGTH

This invention relates broadly to a novel blend of a (meth)acrylic homo- or copolymer and a polyolefin, the blend having high resistance to sagging without increasing melt viscosity, and to a method of making the same.

Non-polar polyolefins, especially polypropylene and polyethylene and mixtures thereof, in various low-density, high-density, and linear low-density form, are major articles of commerce for a wide variety of uses. Nevertheless, there exist specialty needs for which the marketplace has not provided a satisfactory answer. Among these are the need to overcome the difficulty of thermoforming and processing of the polyolefin, especially unfilled polyolefin, in a molten or semimolten form (substantially above its melting point); the polyolefin tends to sag readily under its own weight because it exhibits an undesirably low stiffness, and to form shapes of grossly non-uniform thicknesses upon thermoforming. Attempts to correct this by increasing the molecular weight lead to difficulties in processing the higher molecular weight polyolefin not encountered with lower molecular weight polymers.

Several solutions to this melt strength problem, otherwise described as low modulus under low shear conditions, have been offered, such as controlled branching of the polyolefin, irradiation of the polyolefin to control cross-linking, and especially the use of additives based on segmented copolymers, i.e., graft or block copolymers, of polyolefins in combination with (meth)acrylic ester polymer segments or polystyrene segments. These additives all suffer from relatively expensive or laborious separate grafting operations prior to blending with the polyolefin.

Harrop et al., U.S. Pat. No. 4,094,927, describes copolymers of higher alkyl methacrylates with methacrylic acid as useful additives for improving the melt strength of polyolefins, but his additive polymers were found to "plate-out" from the polyolefin blends during extensive processing runs, causing build-up at die lips and interrupting the extrusion process. Harrop, U.S. Pat. No. 4,156,703, describes that acrylic polymers, most preferably those based on methyl methacrylate, are useful in mill-processing polyethylene, which is a high-shear process, but does not extend his teachings to polypropylene.

I have now discovered that high molecular weight polymers and certain copolymers of $C_{10}$ to $C_{30}$ alkyl (meth)acrylates, such as can be prepared by, e.g., aqueous emulsion polymerization, are useful additives for improving the melt strength of polypropylene. Further objects and advantages of this invention will appear as this specification progresses.

Broadly, the aforesaid objects and advantages are accomplished by preparing a melt blend of a homopolymer of propylene or a copolymer of propylene with up to 40 weight percent of another monoolefin with a homopolymer of one or more of a $C_{10}$ to $C_{30}$ alkyl (meth)acrylate or a copolymer containing at least 70 weight percent of the one or more $C_{10}$ to $C_{30}$ ester of an alkyl (meth)acrylate with up to 30 weight percent of one or more of a $C_1$ to $C_9$ alkyl (meth)acrylate, the homopolymer or copolymer having a weight-average molecular weight of at least 670,000, more preferably at least 1,500,000. The blend which demonstrates good melt strength improvement may be characterized by a relative characteristic time at least five (5) times that for the unmodified homo- or copolymer of polypropylene, under the conditions temperature 190° C. and shear stress 1000 dynes/$cm^2$, and also a melt strength ratio (as judged by relative sag resistance) at least 5 times that of the polyolefin absent the additive polymer. In one preferred blend, the emulsion-prepared copolymer is a copolymer of 90 weight percent $C_{16}$ and $C_{18}$ alkyl methacrylates and 10 weight percent of methyl methacrylate.

By emulsion polymerization is meant the polymerization process which is carried out in an aqueous media with water-insoluble or slightly water-soluble monomers to form a dispersion of polymer stabilized by emulsifier. The resulting small particles (50–1000 nm.) do not settle but form a stable "emulsion" or dispersion. It is a well-known process for polymerizing vinyl and vinylidene monomers.

It is known that it is difficult to polymerize monomers such as the higher alkyl (meth)acrylates, which are almost completely insoluble in water, with conventional amounts of emulsifiers and those conventional initiators which are effective for lower alkyl (meth)acrylate monomers, such as ethyl acrylate or methyl methacrylate. Problems encountered include poor conversion to polymer, puddling of monomer with resultant gum, phase separation of particles, and non-uniform copolymerization in the presence of monomers have a higher water solubility. Specialized methods have arisen for polymerizing these monomers to high conversion at acceptable rates, such as the use of a co-solvent with some water solubility, or the use of a carrier for the monomer, such as cyclodextrin, or by or by adding a low level, such as about 5 to 10%, of methyl methacrylate, which is then polymerized, after completion of the polymerization of the higher alkyl methacrylate. Some of these methods adversely affect the molecular weight of the poly (higher alkyl (meth)acrylate). A method which is effective is that of Sherman and Smith, U.S. Pat. No. 3,062,765, utilizing low levels of water-miscible solvents for the monomers, such as acetone.

Other preparative methods are useful for forming the poly (higher alkyl (meth)acrylate) homo- and copolymers. Solution polymerization may be employed, utilizing low levels of initiators and reaction temperatures to achieve the desired molecular weight. Suspension and non-aqueous dispersion methods may also be utilized.

The resulting homo- or copolymer (which may be a branched or very lightly crosslinked polymer) may be blended with polyolefin pellets or spheres, including spheres with internal surface area, either in emulsion form (with evaporation of the water) or after isolation by coagulation, spray-drying, or other means of removing the water present. The resulting blend may be extruded into a desired shape either directly, or after pelletization of the blend for ease in further processing. The resulting blended product exhibits high sag resistance without an unacceptable increase in melt viscosity.

The invention further relates to articles prepared from the above polymer blends, which articles may be in extruded, calendered, thermoformed or molded form, or which may be in the form of a fiber, sheet, or hollow container.

Polyolefins are often produced with one or more stabilizers to prevent degradation of the polymer appearance or physical properties during processing and/or end use. Such stabilizers may include metal salts such as metal stearates, which act as acid acceptors, hindered phenols, or phosphites which act as antioxidants, and sulfur-containing organic esters or derivatives, added as heat stabilizers. Examples of such additives, which are usually proprietary to the supplier, are metal stearates, 2,6-dimethylphenolic compounds, Irgafos 168 and thiodiesters of long-chain alcohols. Polyolefins may also contain light stabilizers, such as hindered amines, hydroxy benzotriazoles, and the like. All of the polyolefins used in the present examples are thought to contain small amounts of these proprietary stabilizers.

One way to specify the blend composition is that at least about 0.2% of the total formulation (polyolefin plus melt-strength additive) should be a polymer of a $C_{10}$ to $C_{30}$ alkyl (meth)acrylate within the molecular weight limits specified. The preferred maximum amount is about 10% (meth)acrylic ester polymer, with up to about 5% (meth)acrylic ester polymer being especially preferred for cost optimization and optimization of most properties of the blend.

Optionally, the blend may be further modified by the introduction of fillers (both inorganic and organic), fibers, impact modifiers, colorants, stabilizers, flame retardants, and/or blowing agents.

Blowing agents may be gases, such as nitrogen or carbon dioxide, admixed with the polymer melt in the extruder and allowed to expand upon extrusion. More often, blowing agents are solids which liberate gases, usually nitrogen, at a specific melt temperature, and which are mixed into the melt, or blended from a precompounded mixture of the blowing agent dispersed in a polymeric matrix. The melt temperatures for the polyolefins are typically in the range of about 200° to about 230° C., although other temperatures may be used, depending on the specific blowing agent. Solid blowing agents include azo compounds such as azodicarbonamides, azoisobutyronitriles, hydrazo compounds, or compounds containing the nitroso group.

The processing of the polyolefin//polymer of a $C_{10}$ to $C_{30}$ alkyl (meth)acrylate blend for improved sag resistance is performed in the melt. The sag resistance test described herein is an appropriate measure of achievement of the desired resistance, and is quantified by stating that acceptable and novel improvement of melt strength requires a sag slope value for the blend (which contains 5 weight percent of $C_{10}$ to $C_{30}$ alkyl (meth)acrylate polymer, based on total content of polyolefin and $C_{10}$ to $C_{30}$ alkyl (meth)acrylate polymer) below 20% of the value for the unmodified polypropylene under similar test conditions. This value converts to a melt strength ratio, defined as $$\frac{\text{sag resistance of matrix polymer}}{\text{sag resistance of blend containing 5\% of segmented copolymer}}$$

of at least 5.

The blend of the segmented copolymer and polyolefin is useful in thermoforming, especially of large objects which sag prior to thermoforming, such as containers, cups, panels and the like. Thermoforming of polypropylene, including a list of commercial uses and a description of test methods, such as sag testing, is described in J. L. Thorne, "*Thermoforming*", Munich/Vienna/New York (1987). The blend is also useful in film making (especially blowing and extruding), blow molding, such as for forming drums, coolers industrial parts, automotive parts, and the like, fiber spinning, acid and basic dyeing, foaming, extrusion (sheet, pipe, and profile), coextrusion (multilayer film, sheet, preforms, and parisons, with or without the use of tie layers), hot melt adhesives, calendering, and extrusion coating (for the preparation of polymer/fabric, carpet, foil, and other multilayer constructions). Such $C_{10}$ to $C_{30}$ alkyl (meth)acrylate polymers, may be useful when blended with polyolefins for improved printability. The polymers of $C_{10}$ to $C_{30}$ alkyl (meth)acrylate themselves may be useful as tie layers between otherwise incompatible polymers.

When polypropylene is modified with the $C_{10}$ to $C_{30}$ alkyl (meth)acrylate polymers of the present invention, it may be employed in the manufacture of many useful objects, such as extrusion- or injection-blown bottles for packaging of foodstuffs, aqueous solutions such as intravenous feeds, hot-filled items such as ketchup, or extruded articles in profile form such as clips, scrapers, window and door casings and the like. The foamed articles may be used as substitutes for wood in moldings, for packaging materials, for insulation or sound-deadening materials, for food containers, and other rigid-article applications. Films may be used in many protective or wrapping applications, such as for food packaging, blister packaging of consumer goods, and the like.

The $C_{10}$ to $C_{30}$ alkyl (meth)acrylate polymers of the present invention may be useful in preparing polyolefin fibers, especially polypropylene fibers. Polypropylene is relatively easy to process into fibers having high strength and toughness, but polypropylene fibers show certain deficiencies which include difficulty in dyeing and poor long-term dimensional stability. The improved sag resistance noted for the present segmented polymers in a polypropylene matrix should correspond to improvements in creep resistance of the fiber.

Polypropylene may be formed into fibers by slitting tape from extruded film to form large-denier, coarse fibers, by extruding monofilaments into large-denier fibers with a controlled cross-sectional size, or by extruding multifilaments through a spinneret to produce bundles of small-denier fibers. In all cases, the fibers may be draw-textured.

Polypropylene fibers may be used for, among other things, strapping, netting (including fish nets), slit tape, rope, twine, bags, carpet backing, foamed ribbon, upholstery, rugs, pond liners, awnings, swimming-pool covers, tarpaulins, lawn-furniture webbing, shades, bristles, sutures, cigarette filters, nonwoven fabrics, such as for tea bags, bed sheets, bandages, diaper liners and the like, and for doll hair, apparel and the like.

The polypropylene, $C_{10}$ to $C_{30}$ alkyl (meth)acrylate polymer, and any additives are blended in the melt on a 7.6 cm by 17.8 cm electric mill with a minimum gap of 3.8 mm set at 190° C. Once the material has fluxed, it is mixed an additional 3 minutes. Higher temperatures are used for higher viscosity materials (for example, mfr=0.5–2 material is done at 195°–210° C.). While still hot, the material is either compression molded or cut into small chunks (about 1–2 cm in each dimension) for granulation (5 mm screen). The polyolefin blends are compression molded in an electrically heated Carver press 15×15 cm or Farrel press 30.5×30.5 cm. The samples are molded between stainless steel with an appropriate spacer to provide the required thickness 0.25–3.8 mm. In one method the hot melt is taken directly from the mill roll and placed between two stainless steel sheets. This is then placed in the press set at 190° C. and pressed at high pressure (68–91 metric tonnes for the Farrel press and 6820 kg for the Carver press). After three minutes the mold is placed in an unheated press at high pressure for three minutes. In the other procedure, granulated material or pellets produced from an extrusion, Haake, or milling operation are dried and then compression molded. The procedure used is the same as for molding a melt except that a 5 minute preheat is used while maintaining a slight pressure on the press. This is followed by the high pressure molding in the hot and cold presses. A hot press of 190° C. is usually sufficient for mfr=4 polypropylenes, but higher viscosity (lower mfr) polypropylenes would split during sag testing unless higher molding temperatures are used (195°–210° C.).

The sag tests are performed on a compression molded sheet 10×10×0.15 cm. This sheet is clamped in a frame with a 7.6-cm-square opening. There are metal rulers attached to the front and back of the frame for use in measuring sag. The frame and sheet are placed in a hot, forced air oven (typically at 190° C.). The amount of sag of the center of the sheet is then recorded as a function of time. Typically, the sag is first recorded at 2.5 cm but for slow sagging materials sags as low as 16 mm are recorded. Data is recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The advantage of comparing slopes in this manner is that it eliminates any differences in oven cooling when the sample is introduced.

The recoverable compliance test is carried out on a Rheometrics Stress Rheometer. The sample is placed between the parallel plates (1 mm gap) of the Rheometer at 190° C. and subjected to a shear stress of 1000 dynes/sq. cm. The stress is applied for 1000 seconds during which time the compliance versus time is recorded. The shear stress is then removed and the sample allowed to recover. The compliance versus time is recorded again and the final compliance at 1000 seconds is determined. The recoverable compliance is the difference between the final compliance of the stress cycle and the final compliance from the recovery cycle. The sample is a small disk (25 mm diameter) cut from a 60 mil (2.12 mm.) plaque, which is prepared by melt blending the sample into the polyolefin on an electric mill at 190° C., then compression molding the plaque in an electrically heated Carver press at 190° C. for three minutes and at 70 metric tonnes with a 60 rail (2.12 mm.) spacer followed by cold pressing for three minutes.

From this test, the melt viscosity can be extracted from the data for the first cycle at constant stress. The product of the melt viscosity in poundals-seconds times the recoverable compliance in inverse poundals is designated the characteristic time. By comparison with tests on preparations of melt strength additives from other synthetic routes, it can be established that an outstanding melt strength additive will exhibit a compliance time at least five (5) times that for the unmodified base polypropylene, under the conditions temperature 190 ° C. and shear stress 1000 dynes/cm$^2$.

The examples are intended to illustrate the present invention and not to limit it except as it is limited by the claims. All percentages are by weight unless otherwise specified and all reagents are of good commercial quality unless otherwise specified.

EXAMPLES

The following procedure and apparatus is used to prepare the segmented copolymers.

Example I

To a reactor equipped with a means for sparging with nitrogen, a stirrer, and means for adding monomer and initiator is charged 250 grams of de-ionized water, which is then sparged with nitrogen for 30 minutes. Separately is prepared a pre-emulsified mix (homogenizer at high speed for 8 minutes under nitrogen) of 180 grams stearyl methacrylate, 20 grams of methyl methacrylate, 175 grams of deionized water, and 15.7 grams of a 23% aqueous solution of sodium dodecylbenzenesulfonate (1.8%, based on monomer (BOM)). The water contains 0.007 grams of ferrous sulfate and 0.07 grams of ethylenediamine tetra-acetic acid. The emulsified monomer mix is then charged to the reactor, and the contents heated to 50 ° C. with agitation at 280 rpm. Then there is added 20 grams of a 1% solution of sodium formaldehyde sulfoxylate (0.1% BOM); after 2 minutes is added 0.05 grams of (70% active) t-butylhydroperoxide (0.025% BOM). The polymerization reaction exotherms; at the exotherm peak another 20 grams of a 1% solution of sodium formaldehyde sulfoxylate (0.1% BOM) is added. After 15 minutes longer the reaction temperature is adjusted to 60° C.

After 20 minutes longer, 10 grams of methyl methacrylate, 10 grams of a 1% solution of sodium formaldehyde sulfoxylate, and 0.015 grams of t-butyl hydroperoxide are added; a similar addition is made after an additional 30 minutes. The reaction is then held at 60° C. for 30 minutes and then cooled. The polymer is recovered by freeze-drying the emulsion. Molecular weights are determined by gel permeation chromatography against a poly(methyl methacrylate) standard.

Example II

To a reactor equipped with a means for sparging with nitrogen, a stirrer, and means for adding monomer and initiator is charged 250 grams of de-ionized water, which is then sparged with nitrogen for 30 minutes. Separately is prepared a pre-emulsified mix (homogenizer at high speed for 8 minutes under nitrogen) of 180 grams stearyl methacrylate, 20 grams of methyl methacrylate, ) 0.25 grams trimethylolpropane triacrylate, 175 grams of de-ionized water, and 15.7 grams of a 23% aqueous solution of sodium dodecylbenzenesulfonate (1.8%, based on monomer (BOM)). The water contains 0.007 grams of ferrous sulfate and 0.07 grams of ethylenediamine tetra-acetic acid. The emulsified monomer mix is then charged to the reactor, and the contents heated to 50° C. with agitation at 280 rpm. Then there is added 20 grams of a 1% solution of sodium formaldehyde sulfoxylate (0.1% BOM); after 2 minutes is added 0.05 grams of (70% active) t-butylhydroperoxide (0.025% BOM). The polymerization reaction exotherms; at the exotherm peak another 20 grams of a 1% solution of sodium formaldehyde sulfoxylate (0.1% BOM) is added. After 15 minutes longer the reaction temperature is adjusted to 60° C.

After 20 minutes longer, 10 grams of methyl methacrylate, 10 grams of a 1% solution of sodium formaldehyde sulfoxylate, and 0.015 grams of t-butyl hydroperoxide are added; a similar addition is made after an additional 30 minutes. The reaction is then held at 60° C. for 30 minutes and then cooled. The polymer is recovered by freeze-drying the emulsion. Molecular weights are determined by gel permeation chromatography against a poly(methyl methacrylate) standard.

Example III

In this Example, the melt-strength modifiers of Examples 1–2 are blended with a commercial polypropylene homopolymer, melt flow rate=0.5, density 0.905, and the rheological properties and sag slope determined as described above. In this experiment, a melt strength ratio of 5 or greater would require a sag slope of 0.18 or less. It is seen that the linear additive polymer and the lightly branched additive polymer (Examples III-2 and III-3) have characteristic times much higher than the control without additive (Example III-1). These blends also exhibit no measurable sag slope in the sag test, and so must have a melt strength ratio of greater than 5.

containing at least 70 weight percent of the one or more $C_{10}$ to $C_{30}$ ester of an alkyl (meth)acrylate with up to 30 weight percent of one or more of a $C_1$ to $C_9$ alkyl (meth)acrylate, the emulsion-prepared homopolymer or copolymer having a weight-average molecular

| | Examples | $M_w$ of Additive | $M_n$ of Additive | Amount of additive, % | Melt viscosity, Pa-sec. × 0.00001 | $J_o$, Recoverable compliance, 1/Pa × 1000 | Characteristic time, s | Sag slope (NM = too low to measure (<0.02)) |
|---|---|---|---|---|---|---|---|---|
| #1. | Control | NA | NA | 0 | 0.463 | 0.504 | 23 | 0.91 |
| #2. | StMA/MMA//MMA = 90/10//5 | 670,000 | 230,000 | 5 | 0.695 | 1.92 | 133 | NM (<0.02) |
| #3. | StMA/MMA/TMPTA//MMA = 90/10/0.125//5 | 3,700,000 | 560,000 | 5 | 0.924 | 1.92 | 178 | NM (<0.02) |

Melt Properties of Blends with Polypropylene Homopolymer (mfr = 0.5)

Example IV

In this Example, the melt-strength modifiers of Examples 1–3 are blended with a second commercial polypropylene, described as a copolymer with 7.4% ethylene, melt flow rate of 0.7, and the rheological properties determined as described above. A control is also prepared (Example IV-4) with a commercially attractive melt-strength modifier for polypropylene prepared by the method of Natoli et al., U.S. Pat. No. 5,247,024. It is seen that the linear polymer and the lightly branched polymer (Examples IV-2 and IV-3) have characteristic times much higher than the control and the formulation with a commercially attractive melt-strength additive (Examples IV-1 and IV-4).

weight of at least 670,000, the blend being characterized by (c) a relative characteristic time at least five (5) times that for the unmodified homo- or copolymer of polypropylene, under the conditions temperature 190° C. and shear stress 1000 dynes/cm², and (d) a melt strength ratio (as judged by relative sag resistance) at least five (5) times that of the unmodified homo- or copolymer of polypropylene.

2. The composition of claim 1 wherein the emulsion-prepared homopolymer or copolymer has a weight-average molecular weight of at least 1,500,000.

| | Examples | $M_w$ of Additive | $M_n$ of Additive | Amount of additive, % | Melt viscosity, Pa-sec. × 0.00001 | $J_o$, Recoverable compliance, 1/Pa × 1000 | Characteristic time, sec. |
|---|---|---|---|---|---|---|---|
| #1. | Control | NA | NA | 0 | 0.623 | 0.988 | 62 |
| #2. | StMA/MMA//MMA = 90/10//5 | 670,000 | 230,000 | 5 | 0.966 | 5.44 | 526 |
| #3. | StMA/MMA/TMPTA//MMA = 90/10/0.125//5 | 3,700,000 | 560,000 | 5 | 1.23 | 5.21 | 639 |
| #4. | PP//PMMA Graft | NM | NM | 5 | 5.99; 8.04 | 1.37; 1.27 | 82; 110 |

Melt Properties of Blends with Polypropylene Copolymer

I claim:

1. A melt blend of
   (a) a homopolymer of propylene or a copolymer of propylene with up to 40 weight percent of another monoolefin, and
   (b) an emulsion-prepared homopolymer of one or more of a $C_{10}$ to $C_{30}$ alkyl (meth)acrylate or a copolymer 3. The composition of claim 1 wherein the emulsion-prepared copolymer is a copolymer of 90 weight percent $C_{16}$ and $C_{18}$ alkyl methacrylates and 10 weight percent of methyl methacrylate.

* * * * *